March 21, 1950   C. F. W. LIEDTKE   2,501,571
TOOTHED GRIPPING GLOVE
Filed April 17, 1947
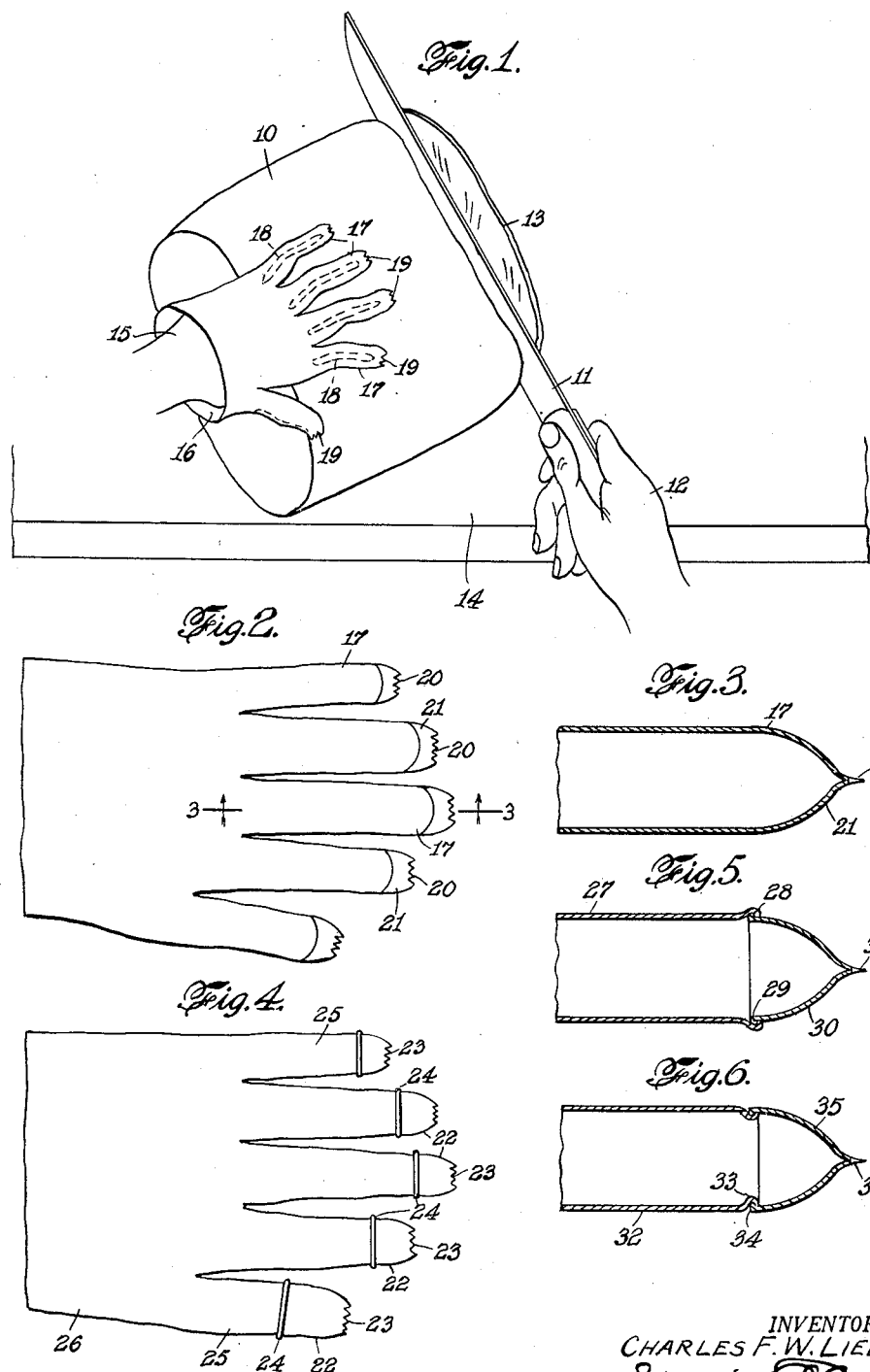
INVENTOR.
CHARLES F. W. LIEDTKE
BY Marvin L. Emry
ATTORNEY.

Patented Mar. 21, 1950

2,501,571

UNITED STATES PATENT OFFICE 2,501,571

TOOTHED GRIPPING GLOVE

Charles F. W. Liedtke, New York, N. Y.

Application April 17, 1947, Serial No. 742,128

2 Claims. (Cl. 2—161)

This invention relates to tooth tipped gloves for ensuring a grip on soft materials which tend to slip from the hand when attempting to cut the same, and refers particularly to a type of glove which has teeth which can be forced into gripping engagement with said material to hold it in position for cutting.

The main object of my invention is to provide a special glove for butchers and others to use when cutting meat, cheese and other foods and materials, which makes it possible, without any other facilities being used, to lay the hand on the meat and thereby successfully hold it in place while the other hand operates a knife to cut the meat.

Another object is to provide such a glove which normally fits the hand but at the ends of the fingers has a plurality of groups of teeth resembling saw teeth which can at least superficially engage with the meat to be gripped and held for chopping or cutting the same.

A further object is to provide such a glove with end caps on the finger tips which have integral rows of teeth which can be superficially engaged with, or released from, the surface of the meat to be cut, allowing instant shifting of the hand to a new position on the meat for further cuts thereon.

It is also an object to have a glove of the character indicated which may have toothed end caps for the finger tips which are made of metal, plastic or any other suitable material and which in at least one form are removable from the glove.

Other objects and the advantages of my invention will appear in greater detail as the specification proceeds.

In order to bring out the features of this invention to make it clearly comprehensible, the same is embodied in several forms in the accompanying drawing forming part hereof, in which;

Figure 1 is a perspective view of the mentioned glove being used to hold a piece of meat being cut;

Figure 2 is a plan view of a glove embodying the invention according to a slight modification;

Figure 3 is a section of the same as taken on line 3—3 in Figure 2;

Figure 4 is another plan view of a glove embodying a further modification; and

Figure 5 is a section of another modification similar to the section of Figure 3; while Figure 6 is also a section of a further modification.

Throughout the views, the same reference numerals indicate the same parts.

In industry and the various arts, the hand is so often used for handling objects of every type, that almost everything can be properly manipulated by the hand alone or when fortified with a glove or other covering or reinforcement. When the material to be handled takes the form of large pieces of meat, cheese, or is a large vegetable of more or less rounded form, it may tend to slip out of control when it is desired to cut slices therefrom. This tendency is especially true of large pieces of meat, and is even more emphatic when no large bone is present to form a handle or stop by which to control the piece. It is now proposed to so equip a glove that it will be possible to securely hold a piece of soft meat in firm position for cutting the same without danger of slipping or occurrence of accidents due to such slipping when a knife is used for the cutting operation.

Hence, in the practice of my invention, and referring now again to the accompanying drawing, a piece of meat or the like 10 is being cut by a knife 11 held by the right hand 12 to obtain the slice 13 while being held in place on a cutting block or counter 14 by the left hand 15 provided with a special glove 16 made of leather, rubber, plastic or fabric, with fingers 17, 17, etc., each having a whalebone reinforcement 18 along the back thereof to stiffen the fingers and thereby render them more firm and under control against too easy flexing. Upon the ends of these fingers are provided rows of transversely arranged groups of teeth 19, 19, etc., these teeth being formed of metal or plastic applied to the finger tips in any suitable manner. For example, the ends of the fingers may have a row or group of saw-shaped teeth made of plastic cemented on the tips by means of plastic cement, that is, teeth of cellulose acetate or other plastic cemented on the finger tips by means of acetate cement or other plastic cement. Horn or whalebone may also be used for the teeth, if desired. The finger tips will then effectively grip the meat when bent slightly in-ward to dig into the surface of the meat, so that the latter is prevented from slipping and possibly causing an accidental cut on the hand by knife 11.

In Figure 2, there is no whalebone used, but the rows of teeth 20, 20, etc., are small metal shells terminating in the toothed ends serving the same purpose as teeth 19 described. These shells 21 are secured to the finger tips by sewing or cementing them thereto. On the other hand, the shells may be formed by dipping the finger tips into plastic cement of the acetate type and then shaping the ends into wedge shaped shells before they are dry and finally shaping up the teeth thereon as even shown in Figure 3. The shells 22 shown in Figure 4 are either of metal or rigid plastic with teeth 23 and rear flanges 24, while the fingers 25 of glove 26 are made of flexible material and are drawn over the finger caps or shells 22 after the latter have first been placed on the fingers.

In Figure 5, the glove finger 27 has an end bead 28 interlocking with the inner bead 29 of the finger cap 30 carrying the end teeth 31, while in the glove finger 32 in Figure 6, an end groove portion 33 is engaged by the rear rib or flange 34 on finger cap 35 having the end row of teeth 36, the cap in any case being of durable and rigid material such as metal or hard plastic and the teeth integral therewith.

Manifestly, variations may be resorted to and parts and features may be omitted or modified within the scope of the appended claims.

Having now fully described my invention, I claim:

1. In a gripping glove for gripping soft materials such as meat and the like, comprising a glove proper having thimble like finger members, the feature which includes a group of teeth fixed at the tips of said finger members in alignment with the longitudinal axis of said finger members.

2. In a gripping glove for gripping soft materials such as meat and the like, comprising a glove proper having finger members which are open at the ends, the features which include finger caps which are secured to the open ends of the members to close the same, and a generally flat row of straight teeth fixed upon the caps and pointing from the tips of the finger members in alignment with the longitudinal axis of each finger member.

CHARLES F. W. LIEDTKE.

REFERENCES CITED

The following references are of record in the file of this patent:

UNITED STATES PATENTS

| Number | Name | Date |
| --- | --- | --- |
| 137,771 | Gash et al. | Apr. 15, 1873 |
| 183,375 | Cutliff | Oct. 17, 1876 |
| 782,517 | Niebuhr | Feb. 14, 1905 |
| 1,128,556 | Vincent | Feb. 16, 1915 |
| 1,243,622 | Neilsen | Oct. 16, 1917 |
| 1,911,500 | Gowdy et al. | May 30, 1933 |
| 2,025,357 | Pagan | Dec. 27, 1935 |

FOREIGN PATENTS

| Number | Country | Date |
| --- | --- | --- |
| 1,567 | Great Britain | Sept. 5, 1904 |